United States Patent [19]

Larson

[11] 4,161,241

[45] Jul. 17, 1979

[54] DASHPOT APPARATUS INCLUDING A FLEXIBLE DIAPHRAGM PISTON

[75] Inventor: William C. Larson, Rochester, Mich.

[73] Assignee: Colt Industries Operating Corp., New York, N.Y.

[21] Appl. No.: 859,880

[22] Filed: Dec. 12, 1977

[51] Int. Cl.² .................................... F16F 9/04
[52] U.S. Cl. ........................... 188/298; 58/42; 123/103 R; 200/34; 267/123
[58] Field of Search ............ 188/282, 298, 317; 267/65 A, 65 B, 114, 122, 123; 16/66; 123/103 R, DIG. 11; 200/34; 58/42

[56] References Cited

U.S. PATENT DOCUMENTS

| | | | |
|---|---|---|---|
| 2,702,398 | 2/1955 | Marcus | 16/66 |
| 2,741,474 | 4/1956 | Babitch | 188/298 X |
| 2,855,481 | 10/1958 | Lindahl | 188/298 X |
| 3,081,847 | 3/1963 | Smitley | 267/123 X |
| 3,213,333 | 10/1965 | Mikina et al. | 188/298 X |
| 3,716,354 | 2/1973 | Reen | 75/246 X |

Primary Examiner—George E. A. Halvosa
Attorney, Agent, or Firm—Walter Potoroka, Sr.

[57] ABSTRACT

A dashpot apparatus is shown as having a housing containing a movable diaphragm which, in turn, effectively establishes or defines two variable and distinct chambers at either side thereof within the housing; a movable rod or actuator extending generally through a wall of the housing is operatively connected to the diaphragm; and a porous air bleed member operatively carried by the actuator within the housing serves to permit a controlled rate of air flow from a first of the two variable chambers to the other of the two variable chambers in order to thereby control the velocity of movement of the actuator in the direction of travel toward the first of such chambers.

2 Claims, 6 Drawing Figures

DASHPOT APPARATUS INCLUDING A FLEXIBLE DIAPHRAGM PISTON

BACKGROUND OF THE INVENTION

Heretofore, the prior art has suggested various forms of dashpot means for slowing the movement of a related means at some preselected point in its travel. It has been accepted practice to employ dashpot means in combination with or in association with engine carburetors, and other fuel metering devices, wherein, for example, it was desired to somewhat retard the otherwise relatively fast movement of the associated throttle means toward the curb idle position. The sole purpose of such prior art dashpot devices was to assure that the throttle would not close too rapidly as to thereby cause engine stalling. Accordingly, the operating specifications of such prior art devices were broadly stated and usually included broad tolerances since the problem of slowing the throttle valve velocity was not one requiring close tolerances or operating specifications.

It is still highly desirable to damp the rate of throttle closing movement near the end of such closing movement in order to avoid a very sudden change in the rate of air and fuel flow which, if permitted to occur, usually results in rough engine operation and/or engine stalling. However, because of governmentally imposed standards relating to engine fuel consumption and/or exhaust emissions, it has become important to be able to very critically control the rate of throttle closing movement. For example, in a piston type internal combustion engine, it is desirable to have the throttle return towards its closed (curb idle) position as quickly as possible in order to thereby reduce the rate of fuel flow to the engine (as occassioned by, for example, high air flows past the main fuel metering system) and yet, very closely to the end of such closing movement, retard such closing movement in order to avoid the creation of unburned hydrocarbons which would otherwise be emitted into the atmosphere through the engine exhaust.

The prior art structures have been found wanting in that the inherent designs thereof require manufacturing techniques which, in turn, result in assemblies which do not consistently have the degree of control required in order to be able to retard the closing movement of a throttle valve with the degree of exactness presently required.

By way of example, some of such prior art dashpot devices employed a bleed orifice which was comprised of a groove formed in a first surface (as possibly carried by the actuator or dashpot stem internally of the related housing) and a second surface (as possibly carried by a related diaphragm within the housing) which would lie against the first surface and thereby cooperate with the groove to define a bleed passage therethrough. Other prior art devices employed flapper-type valve portions which would cooperate with related orifices to control the bleed action therethrough. Still other prior art devices employed drilled restrictions as bleed orifice means. However, when it is realized that the actual volume rate of air flow through the bleed orifice means is very little, any slight dimensional variation from the theoretically ideal dimension in such elements comprising the prior art bleed orifice means will result in relatively great variations in the volume rate of air flow through that bleed orifice means.

Accordingly, the invention as herein disclosed and claimed is primarily directed toward the solution of the preceding as well as other related and attendant problems.

SUMMARY OF THE INVENTION

According to the invention a dashpot assembly comprises a housing with a movable wall situated therewithin, said movable wall effectively cooperating with the housing to define at least first and second distinct and variable chambers at either side of said movable wall and within said housing, motion transmitting means operatively carried by said movable wall whereby movement of said movable wall toward said first chamber can be imparted, and conduit means carried by said movable wall for completing communication as between said first and second chambers, said conduit means comprising a porous member having the capability of permitting a preselected volume rate of air flow therethrough at a corresponding preselected pressure differential thereacross.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
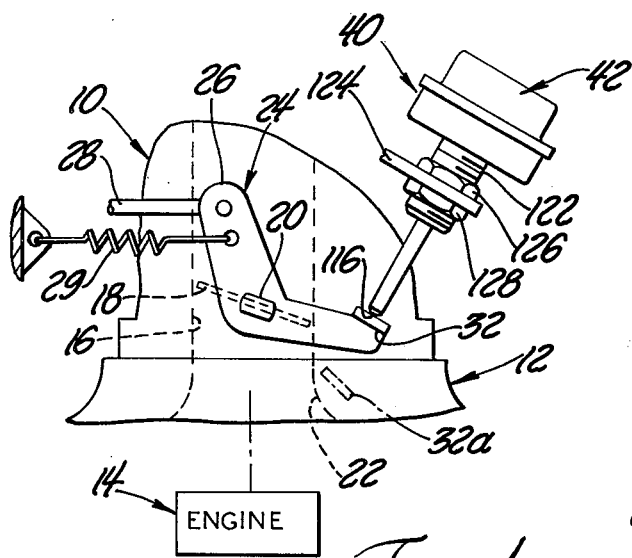
FIG. 1 illustrates apparatus, in fragmentary view, having throttle means controllably closed by associated dashpot apparatus employing teachings of the invention.

Referring now in greater detail to the drawings, FIG. 1 illustrates an induction apparatus, such as, for example, a carburetor 10, carried as atop an intake manifold 12 of an associated engine 14. As generally indicated, the inductive apparatus or carburetor 10 has induction passage means 16 formed therethrough with throttle valve means 18 situated therein and carried as by a pivotally rotatable throttle shaft 20. The throttle valve 18 is variably rotatably openable within induction passage 16 as to thereby accordingly control the flow of motive fluid through the induction passage 16 and into the intake passage 22, communicating therewith, of intake manifold 12.

A throttle lever 24, suitably secured to throttle shaft 20 for rotation therewith, has a first arm portion 26 to which suitable throttle actuating linkage means 28 is operatively connected and leading to, for example, the vehicle operator's throttle actuating foot pedal (not shown but well known in the art) whereby movement of the linkage means to the right causes clockwise opening movement of the throttle valve 18. As is well known, suitable throttle return spring means 29 may be provided to continually yieldingly urge the throttle valve 18 in a closing direction. An other arm 30 of lever 24 is preferably provided with an integrally formed generally transversely extending flange-like portion 32 which, as generally illustrated, is effective for at times engaging a related dashpot apparatus 40 embodying teachings of the invention.

Figure 2:
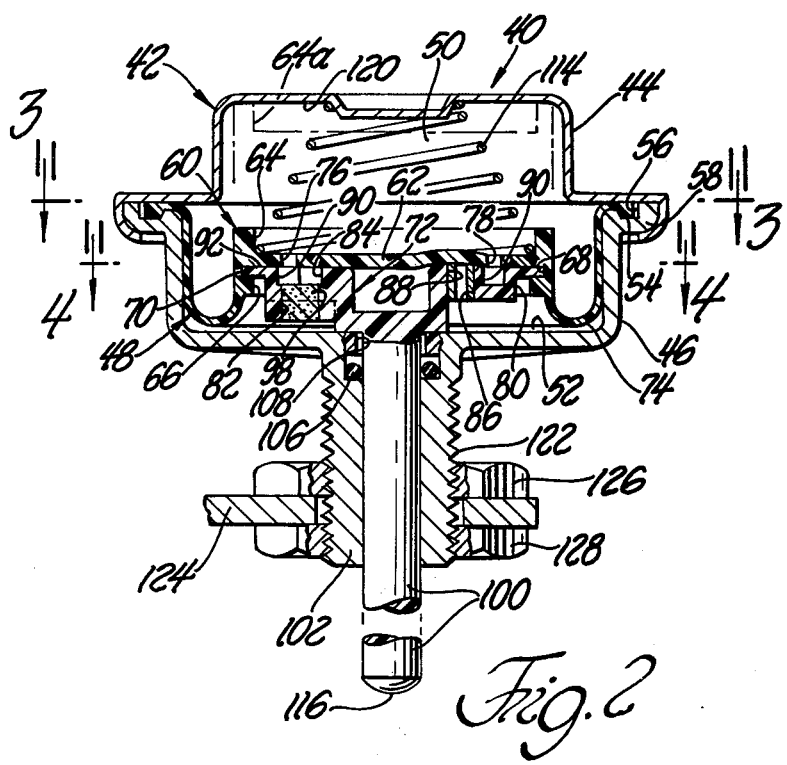
FIG. 2 is an enlarged generally axially extending cross-sectional view of the dashpot apparatus of FIG. 1.

Referring to FIG. 2, the dashpot assembly 40 is illustrated as comprising housing means 42 which, in turn, comprises an upper cup-like housing section 44 and a lower cup-like housing section 46 which cooperate to generally peripherally contain and retain a diaphragm member 48 therebetween which serves to define variable and distinct chambers 50 and 52, at opposite sides of said diaphragm 48 and within housing means 42. As shown, the periphery of the diaphragm means 48 may be provided with a thickened annular portion 54 which, in turn, is received as within an annular groove 56 formed in a flange-like portion 58 of lower housing section 46.

Figure 3:
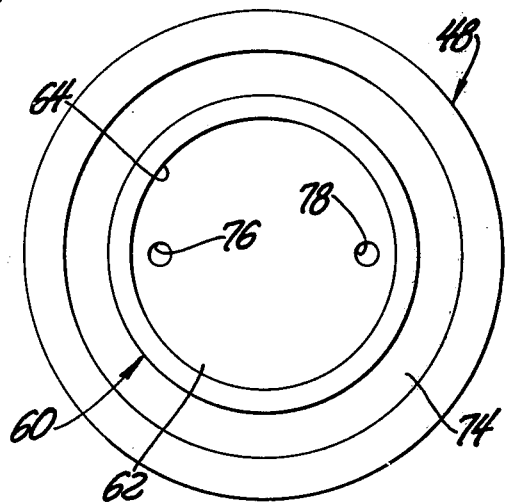
FIG. 3 is a view taken generally on the plane of line 3—3 of FIG. 2, with certain of the elements not shown, and looking in the direction of the arrows.

As shown in FIGS. 2 and 3, the diaphragm means 48 comprises a centrally disposed relatively thicker body portion 60 which, when viewed as in FIG. 3, is circular in configuration and which, in turn, comprises a disc-like central portion 62 with an upwardly directed annular wall 64 formed integrally therewith and generally thereabout. A downwardly directed annular wall 66 is also integrally formed as with central portion 62 and is further provided with a generally radiating annular groove 68 formed therein which tightly receives therein at least a portion of an outwardly radiating annular flange portion 70 of a related metering body 72. The generally central relatively thick body portion 60 is integrally joined to the outer periphery of diaphragm means 48 as through a generally annular relatively thin and flexible intermediate portion 74. Further, as shown in both FIGS. 2 and 3, aperture or passage means 76 and 78 are formed through body section 62.

Figure 4:
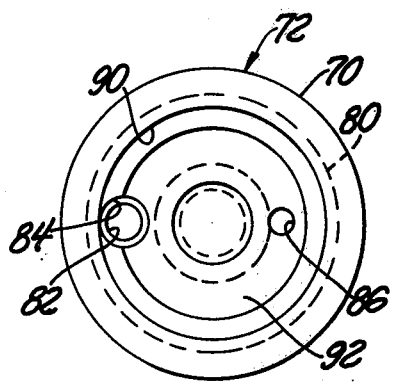
FIG. 4 is a view taken generally on the plane of line 4—4 of FIG. 2, with certain of the elements not shown, and looking in the direction of the arrows.

Referring to both FIGS. 2 and 4, it can be seen that the metering body 72 is illustrated as comprising a generally annular body 80 integrally formed with the annular outwardly radiating flange 70 and having first passage means formed therethrough with said first passage means comprising generally aligned first passage portion 82 and a relatively enlarged second passage portion 84. Second passage means 86 is also formed, as possibly diametrically opposed to the first passage means, through such annular body 80. Such second passage means 86 may further comprise a generally tubular insert 88 which has a conduit, of a preselected effective flow area, formed therethrough. Further, an annular groove or recess 90 is formed in the upper face 92 of metering body 72 and intersects the said first passage means as to communicate therewith. When assembled, conduits or apertures 76 and 78 are in communication with annular groove 90. As can be seen, the upper face 92 is generally flat and as such, as will become more apparent, serves to provide a support or backing face to body portion 62 of diaphragm or movable wall means 48.

Figure 5:
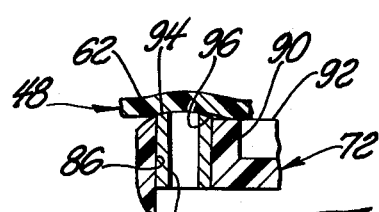
FIG. 5 is a relatively enlarged fragmentary portion of the structure shown in FIG. 2.

As best seen in FIG. 5, the insert 88 is preferably formed as to have an upper end surface 94 of generally spherical configuration which, in turn, is positioned as to extend a slight amount above the plane of surface 92. Accordingly, as will be more fully explained, the fact that end surface 94 thusly projects results in the lower or inner surface 96 of diaphragm means 48 lying thereagainst and effectively sealing or precluding the otherwise free flow of air through the passage of insert 88.

As depicted in FIG. 2, a calibrated flow restrictor, bleed or metering means 98 is received within and carried by passage section 82. In one successful embodiment of the invention, such metering means 98 was a cylindrical piece, comprised of sintered stainless steel, having a nominal diameter of 0.125 inch and a nominal length of 0.125 inch and having a porosity which enabled 4.5 cubic inches of air to flow therethrough (from one axial end through the opposite axial end) within a nominal elapsed time of 32.0 seconds at a nominal pressure differential of 20.0 inches of mercury thereacross with such a rate of flow being established when checked with the metering means 98 being pressed into a section of testing tubing having an internal diameter of 0.120 inch. It should be clear that the practice of the invention is not limited to either the preceding specified material or operating specifications since such can be varied to meet the existing requirements as of the related structure. In any event, in the preferred embodiment, metering means 98 is pressed into passage section 82 as generally depicted in FIG. 2.

Figure 6:
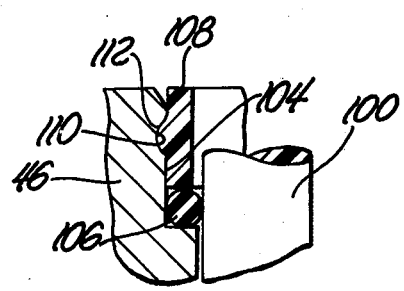
FIG. 6 is a relatively enlarged fragmentary portion of the structure shown in FIG. 2.

As shown in FIG. 2, metering body 72 may be provided with an integrally formed centrally located shaft or rod portion 100 which, as viewed in FIG. 2, extends generally downwardly through a clearance passage formed in a downwardly depending portion 102 of lower housing section 46. As shown in FIGS. 1 and 6, a counterbore 104 receives an annular seal 106 therein which, in turn, is retained as by an annular retainer 108 which, preferably is made of a plastic material permitting limited resilient radial deflection thereof. That is, in the preferred embodiment, counterbore 104 has an annular groove or recess 110 formed in the side wall thereof which seatingly receives a cooperating annular projection 112 carried by the retainer 108. Once the retainer 108 is thusly seated in counterbore 104, it maintains seal 106 in its desired position. In its normal position, a compression spring 114 situated generally within chamber 50 and seated as against the body section 62 (within the confines of wall 64) of diaphragm 48 serves to keep the movable wall means comprised of diaphragm means 48 and metering body means 72 in the position depicted in FIG. 2.

OPERATION OF THE INVENTION

For purposes of description, let it be assumed that dashpot assembly 40 has its elements in the positions shown in FIG. 2 and that throttle valve 18 (FIG. 1) is opened sufficiently as to have moved flange 32 to some position as at, for example, 32a. At this time, rod 100 will be full extended and flange 32 will be spaced some distance from the end 116 thereof.

When the vehicle operator releases the throttle control linkage 28, spring 29 starts to rotate lever 24 and throttle valve 18 counter-clockwise, as viewed in FIG. 1, in the throttle closing direction. This, of course, causes flange or abutment portion 32 to move toward end 116 of rod 100. Since the force of spring 29 is sufficient to overcome the resilient resistance of spring 114, when abutment portion 32 engages end 116 of rod 100, the motion of abutment 32 continues causing movement of rod 100 and the said movable wall means in a direction generally toward chamber 50. More particularly, as the movable wall means 48, 72 is thusly being moved upwardly (as viewed in FIG. 2) the volume of chamber 50 is being reduced and the only way that such volume reduction can be achieved is by permitting a related portion of the air generally contained therein to flow out of the chamber 50. This, in turn, is accomplished by having such chamber 50 air flow through the relatively large effective flow area of combined passage means 76 and 78 which are in registry with annular recess or passage 90. As already described, recess or groove 90 also communicates with conduit portion 84 and conduit portion 82 which contains metering restriction 98. Consequently, the air from chamber 50 is metered into chamber 52 through the porous or permeable metering restriction 98 thereby allowing for the closely controlled rate of movement of movable wall means 48, 72 and rod 100 in the upward direction. Depending on other factors, such as, for example, the provision of other positive stop means associated with the throttle control linkage, the motion described may or may not continue until the upper axial end of wall 64 abuts against the inner wall surface 120 of upper housing section 44. It is contemplated that with the provision of a threaded portion 122 on lower housing extension 102 that a mounting bracket (fragmentarily illustrated) 124 and therefore similarly selectively adjustably positioned relative to the abutment 32. Accordingly, it then becomes possible to select such a position of dashpot means 40, and lock it in such position as by nuts 126 and 128 cooperating with threaded portion 122, as to thereby also establish the normal closed throttle position by permitting such to occur when movable wall means 48, 72 has moved upwardly sufficiently as to place wall portion 64 in an abutting relationship with surface 120 as partially depicted in phantom line at 64a.

During such upward movement, body section 62 of diaphragm means 48 effectively lies against the upper open end of passage 88 thereby effectively precluding flow of air therethrough. However, once the movable wall means 48, 72 has been moved upwardly and subsequently the throttle valve 18 is again moved toward a more fully opened position, spring 114 becomes effective to move movable wall means 48, 72 downwardly toward the position depicted in FIG. 2. It is desirable to have such return motion by spring 114 occur as quickly as possible as to thereby assure having the rod 100, and its end 116, extended as to be in a proper position for engagement by the abutment 32 should the operator again release the throttle linkage 28. In order to achieve such a fast return by spring 114, conduit means 88 is provided with a relatively large effective flow area so that when spring 114 is returning the movable wall means 48, 72 toward chamber 52, or downwardly as viewed in FIG. 2, air within chamber 52 flows relatively freely from chamber 52 through passage or conduit means 88 (during this time the portion of diaphragm body section 62 immediately juxtaposed to conduit means 88 is lifted or moved away from the upper open end of passage 88 by the flow of such air) and between the juxtaposed face of diaphragm body section 62 and face 92 of metering body 72 from where such air flows into annular groove 90 and out of passages 76 and 78 into chamber 50. It should be pointed out that in the preferred embodiment such annular groove means 90 is provided in order to better equalize pressures and therefore resulting forces as applied to the metering body 72.

Although only a preferred embodiment of the invention has been disclosed and described, it is apparent that other embodiments and modifications of the invention are possible within the scope of the appended claims.

I claim:

1. A dashpot assembly, comprising housing means including first and second housing sections, moveable wall means situated within and cooperating with said housing means to define at least first and second distinct and variable chamber means at either side of said moveable wall means and internally of said housing means, said moveable wall means comprising a relatively flexible diaphragm peripherally retained generally between and by said first and second housing sections and having a relatively rigid diaphragm-engaging body, said diaphragm being generally juxtaposed to said diaphragm-engaging body so as to be situated on generally the first chamber side of the diaphragm-engaging body, said diaphragm-engaging body being situated as to be on generally the said second chamber side of said diaphragm, said diaphragm comprising a generally relatively thick diaphragm body portion positioned in juxtaposed relationship to said diaphragm-engaging body, said diaphragm body portion comprising recess-like means formed generally on said second chamber side thereof, said diaphragm-engaging body comprising a flange means, said flange means being received in said recess-like means for operatively connecting said diaphragm to said diaphragm-engaging body, motion transmitting means operatively carried by said moveable wall means and being effective when actuated to move said moveable wall means in a direction toward said first chamber, said motion transmitting means being operatively connected to said diaphragm-engaging body, conduit means carried by said moveable wall means for completing communication between said first and second chambers, said conduit means including sintered gas permeable metering means having the capability of permitting a preselected volume rate of flow of air therethrough at a corresponding air pressure differential thereacross, said conduit means comprising first passage means formed in said diaphragm-engaging body and containing said gas permeable metering means and second passage means formed through said diaphragm body portion and communicating with said first passage means, said second passage means comprising a first conduit section and a second conduit section each formed through said diaphragm and spaced from each other, said diaphragm-engaging body having annular passage means formed in the face thereof juxtaposed to said diaphragm in a manner to inter-connect said first passage means with said second passage means, and third passage means formed through said diaphragm-engaging body, said third passage means being effectively closed to flow therethrough by said diaphragm when said diaphragm and said diaphragm-engaging body are being moved in said direction toward said first chamber, said diaphragm being operative to open said third passage means to flow therethrough from said second chamber to said first chamber when said diaphragm and said diaphragm-engaging body are being moved in a second direction opposite to said first direction and toward said second chamber.

2. A dashpot assembly according to claim 1 wherein said sintered gas permeable metering means comprises stainless steel.

* * * * *